No. 674,794. Patented May 21, 1901.
H. C. CAPEL, Dec'd.
H. G. OGDEN, Jr., Administrator.
POWER TRANSMISSION GEAR.
(Application filed Dec. 15, 1900.)

(No Model.) 2 Sheets—Sheet 1.

THE NORRIS PETERS CO., PHOTO-LITHO., WASHINGTON, D. C.

No. 674,794.　　　　　　　　　　　　　　　　　Patented May 21, 1901.
H. C. CAPEL, Dec'd.
H. G. OGDEN, Jr., Administrator.
POWER TRANSMISSION GEAR.
(Application filed Dec. 15, 1900.)
(No Model.)　　　　　　　　　　　　　　　　2 Sheets—Sheet 2.
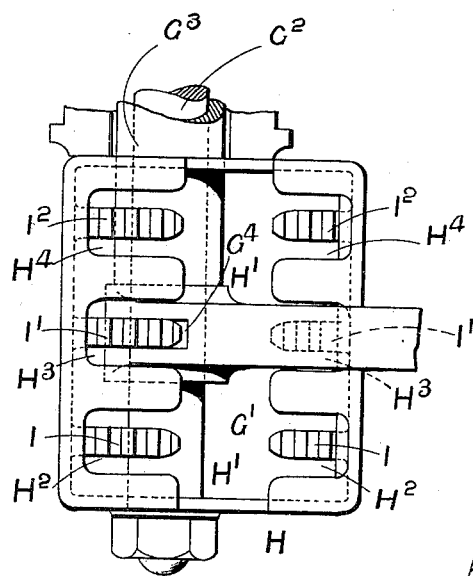
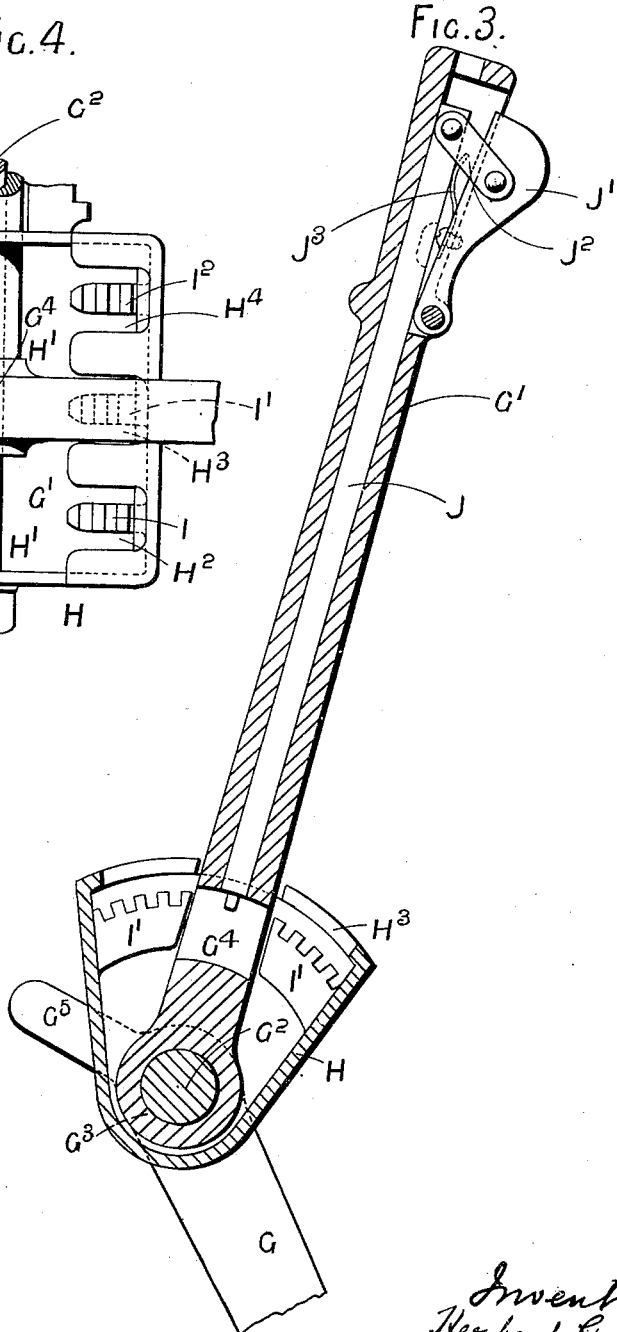

UNITED STATES PATENT OFFICE.

HERBERT G. OGDEN, JR., OF WASHINGTON, DISTRICT OF COLUMBIA, ADMINISTRATOR OF HERBERT CHURCHILL CAPEL, DECEASED.

POWER-TRANSMISSION GEAR.

SPECIFICATION forming part of Letters Patent No. 674,794, dated May 21, 1901.

Application filed December 15, 1900. Serial No. 39,983. (No model.)

*To all whom it may concern:*

Be it known that HERBERT CHURCHILL CAPEL, deceased, late a subject of the Queen of England, and a resident of London, England, did during his lifetime invent certain new and useful Improvements in Power-Transmission Gear, of which the following is a specification.

This invention relates to power-transmission gear comprising variable speed and reversing gear which is particularly applicable to motor-cars, although it may be employed for other purposes.

Figure 1:
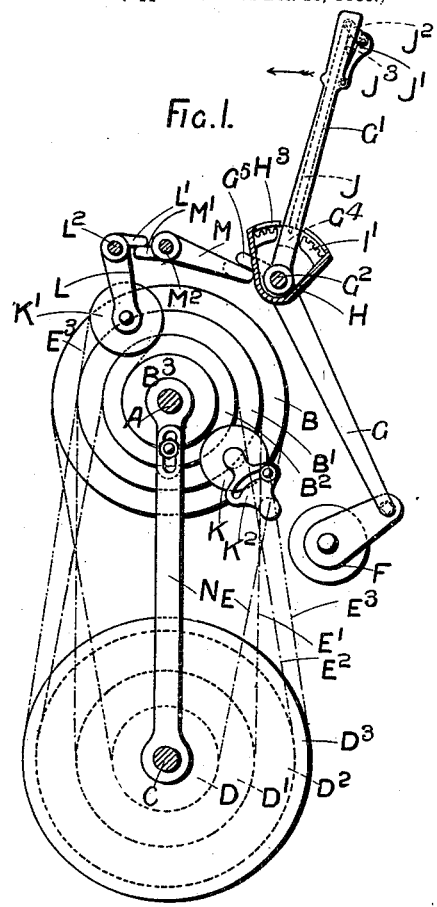
Figure 2:
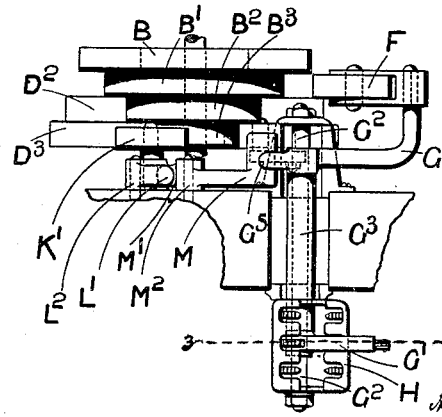

In the accompanying drawings, Figure 1 is an elevation of a power-transmission gear constructed according to this invention. Fig. 2 is a plan of Fig. 1. Fig. 3 is an enlarged vertical section taken on the line 3 3 of Fig. 2; and Fig. 4 is a plan of the locking mechanism, hereinafter referred to.

In carrying out this invention on a driving-shaft A are mounted a plurality of pulleys B, B', $B^2$, and $B^3$, preferably leather-covered. Four pulleys are shown by way of example; but it is to be understood that a greater or less number may be used, if desired. On another shaft C are mounted a corresponding number of similar pulleys D, D', $D^2$, and $D^3$. The pairs of pulleys B D, B' D', and $B^2$ $D^2$ are intended for forward driving and are hereinafter referred to as "driving-pulleys," while the pair $B^3$ $D^3$ are for reversing purposes. The relative diameters of each pair of pulleys is so arranged as to give the desired ratios of speed between the driving-shaft A and the driven shaft C. The pairs of pulleys B and D, B' and D', and $B^2$ and $D^2$ are respectively connected together by sets of connectors, shown as loose driving-bands or chains E, E', and $E^2$. In order to cause the bands E, E', or $E^2$ to transmit power from the driving to the driven shaft, a jockey-pulley F is provided, which is adapted to be pressed against, so as to tighten any one of these bands. The jockey-pulley F is mounted on one arm G of a hand-operated controlling-lever G G', fulcrumed on a rod $G^2$, on which it is capable of lateral movement, so as to bring the pulley F opposite to any one of the driving-bands E E' $E^2$, Fig. 2. The arm G of the controlling-lever is preferably formed so that it has a certain amount of elasticity and, together with the other arm or hand-lever G', is connected with a sleeve $G^3$ and shown integral therewith, carried by the rod $G^2$, Fig. 2. That end of the rod $G^2$ adjacent to the arm G' is secured to a casing H, which is provided with a slot H' to allow of the lateral movement of the arm G' on the rod $G^2$, Figs. 3 and 4. Transverse slots $H^2$, $H^3$, and $H^4$ are also formed in the casing H, the distance between these slots corresponding to the distance between the pairs of pulleys, the slots therefore serving as guides for the lever G'. Within the casing H and adjacent to each pair of slots $H^2$ $H^3$ $H^4$ is arranged a pair of toothed quadrants I I' $I^2$. In the construction illustrated the quadrants are placed so that in plan each appears to lie centrally in each slot. A hand-operated spring-controlled pawl J is located on the handle G' of the controlling-lever G G' and is adapted to gear with any one of the quadrants I I' $I^2$. A slot $G^4$ is made in the lower part of the handle G' for the passage of the quadrants I I' $I^2$, and the pawl J is situated in a longitudinal aperture formed in the arm G'. The pawl J may be lifted out of engagement with the ratchet-quadrants by the operation of a small handle J', pivoted to the arm G' and connected to the pawl J by a link $J^2$. A spring $J^3$ is also provided, which normally tends to force the pawl J downward. Thus the pawl J will be lifted up out of engagement with the ratchet by pressing the upper end of the handle J' toward the arm G' of the lever G G'. The position of the quadrants I I' $I^2$ and the slots $H^2$, $H^3$, and $H^4$ is so arranged in relation to the driving-bands E E' $E^2$ that when the pawl J is in gear with any quadrant the jockey-pulley F will be capable of engagement with the corresponding driving-band.

The reversing-pulleys $B^3$ $D^3$ are connected by another connector, shown as a reversing-band $E^3$, which may be similar in construction to the driving-bands E E' $E^2$ and is arranged to be operated by the means for making the sets of connectors operative. The outer surface of the reversing-band $E^3$ is caused to bear against one of the pulleys $B^3$ $D^3$ by means of two idle pulleys K K', around which it passes, as shown in Fig. 1. The pulley K is mounted on the bracket K², which is adjustably secured to the framework of the machine to which the gear is applied. The pulley K' is mounted in one arm L of a bell-crank lever L L', pivoted at L², and may be operated to tighten the reversing-band E³ against the pulley B³ in the following manner: The lever G is provided with an extension G⁵, which is adapted to operate one end of a two-armed lever M M', pivoted at M², the other arm M' operating the arm L' of a bell-crank lever L L'. The end of the arm M is made of sufficient width to be capable of engagement with the extension G⁵ whatever the lateral position of the controlling-lever G G' on the rod G². Thus on moving the handle G' in the direction of the arrow shown on Fig. 1, so as to pass into the rear half of any of the slots I, I', or I², the extension G⁵ will operate the lever M M' and cause the pulley K' to tighten the band E³, and the reversing-gear will be held in operation by a quadrant which will enter the slot C⁴ in the handle C'. Of each pair of quadrants I I' I² one quadrant serves to hold the levers when in the position for forward driving, the opposite quadrant retaining the levers when reversal is desired. It will be seen that the application of the reversing-band will constitute a very efficient brake to the driven shaft C.

In order to vary the ratio of the speeds of the shafts A and C, the handle of the controlling-lever G G' is moved along the slot H' between the quadrants until the jockey-pulley F is opposite the driving-band corresponding to the desired speed, the position of the jockey-pulley being determined by the engagement of the handle G' with one of the slots H² H³ H⁴. The handle G' is then pressed downward in a direction opposite to that of the arrow shown in Fig. 1, so as to cause one of the quadrants I, I', or I² to pass through the slot G⁴ in the handle, thus causing the jockey-pulley to tighten the driving-band. In order to disconnect the two shafts A and C, it is only necessary to press the handle J' inward, so as to raise the pawl J out of gear from the ratchet and place the controlling-lever G G' in a central position in the slot H, so that all the bands E, E', E², and E³ are loose.

When power-transmission gear constructed according to this invention is applied to a motor-car, the two shafts A and C are preferably connected by links N, slotted to permit adjustment of the distance between the two shafts.

If desired, the slots in the casing H for the reception of the lever G', when reversal is being obtained, may be dispensed with, so as to allow the lever G' to be moved back and effect reversal without the need for accurately positioning it laterally.

What is claimed as the invention, and desired to be secured by Letters Patent, is—

1. In a power-transmission gear, the combination of a driving-shaft, a driven shaft, a plurality of rotary members on each of those shafts, sets of connectors between the members on one shaft and the corresponding members on the other shaft, means for making said connectors operative, another connector, a jockey-pulley K' engaged therewith, levers L' and M, M' operatively connecting said jockey-pulley with the means for making the first-named connectors operative, and a rotary member on each shaft to be engaged by said other connector for a reversal of the driven shaft, substantially as described.

2. In power-transmission gear the combination of a driving-shaft, a driven shaft, a plurality of pulleys on each of the two shafts, driving-bands connecting the pulleys in pairs, a reversing-band extending from one pulley to the other across a line joining the centers of the pulleys, a controlling-lever movable laterally on its fulcrum, a jockey-pulley carried by the controlling-lever, means for positioning the lever so as to bring the jockey-pulley opposite any one driving-band and a jockey-pulley operating on the reversing-band and in operative connection with the controlling-lever substantially as set forth.

3. In power-transmission gear the combination of a driving-shaft, a driven shaft, a plurality of pulleys on each of the two shafts, driving-bands connecting the pulleys in pairs, a reversing-band extending from one pulley to the other across a line joining the centers of the pulleys, a controlling-lever movable laterally on its fulcrum, a jockey-pulley carried by the controlling-lever, a casing inclosing the fulcrum of the controlling-lever, lever-positioning slots in the casing and a jockey-pulley operating on the reversing-band and in operative connection with the controlling-lever substantially as set forth.

4. In power-transmission gear the combination of a driving-shaft, a driven shaft, a plurality of pulleys on each of the two shafts, driving-bands connecting the pulleys in pairs, a reversing-band extending from one pulley to the other across a line joining the centers of the pulleys, a controlling-lever movable laterally on its fulcrum, a jockey-pulley carried by the controlling-lever, a casing inclosing the fulcrum of the controlling-lever, lever-positioning slots in the casing each slot corresponding to a driving-belt, a toothed quadrant in each slot, and a jockey-pulley operating on the reversing-band and in operative connection with the controlling-lever, substantially as set forth.

In testimony whereof I have signed my name to this specification in the presence of two subscribing witnesses.

HERBERT G. OGDEN, JR.,
*Administrator of the estate of said Herbert Churchill Capel, deceased.*

Witnesses:
H. M. GILLMAN, Jr.,
W. CLARENCE DUVALL.